(12) United States Patent
Wang (10) Patent No.: US 10,368,495 B1
(45) Date of Patent: Aug. 6, 2019

(54) TREE PRUNER

(71) Applicant: Green Guard Industry Ltd., Taichung (TW)

(72) Inventor: Kuang Pin Wang, Taichung (TW)

(73) Assignee: Green Guard Industry Ltd., Taichung (TW)

( * ) Notice: Subject to any disclaimer, the term of this patent is extended or adjusted under 35 U.S.C. 154(b) by 0 days.

(21) Appl. No.: 15/902,494

(22) Filed: Feb. 22, 2018

(51) Int. Cl.
*A01G 3/08* (2006.01)
*A01G 3/025* (2006.01)

(52) U.S. Cl.
CPC ............ *A01G 3/081* (2013.01); *A01G 3/0255* (2013.01)

(58) Field of Classification Search
CPC ........ A01G 3/081; A01G 3/0255; A01G 3/08; A01G 3/083
USPC .................................. 30/249, 296.1
See application file for complete search history.

(56) References Cited

U.S. PATENT DOCUMENTS

| | | | | |
|---|---|---|---|---|
| 5,241,752 A | * | 9/1993 | Lutzke | A01G 3/08 30/249 |
| 5,634,276 A | * | 6/1997 | Lin | A01G 3/0255 30/166.3 |
| 5,950,315 A | * | 9/1999 | Linden | A01G 3/0255 30/188 |
| 6,526,664 B2 | * | 3/2003 | Cech | A01G 3/08 30/245 |
| 6,748,663 B2 | * | 6/2004 | Linden | A01G 3/08 30/188 |
| 7,658,011 B2 | * | 2/2010 | Shan | A01G 3/0255 30/188 |
| 2003/0097757 A1 | * | 5/2003 | Chung | A01G 3/0255 30/249 |

FOREIGN PATENT DOCUMENTS

GB 2471774 A * 1/2011

* cited by examiner

*Primary Examiner* — Hwei-Siu C Payer
(74) *Attorney, Agent, or Firm* — C. G. Mersereau; DeWitt LLP (57) ABSTRACT

A tree pruner has a connecting pole. The connecting pole is connected with a main body. The main body includes a blade seat and a blade pivotally connected to the blade seat. The main body is pivotally connected with a rotating wheel. The rotating wheel is connected with a pull member. The rotating wheel is rotatable relative to the main body by pulling the pull member. An end surface of the rotating wheel has a traction portion located away from a pivot axis of the rotating wheel. The blade has a drive arm extending outwardly. One end of a pull rod is pivotally connected to the traction portion. Another end of the pull rod is pivotally connected to the drive arm. By pulling the pull member, the rotating wheel is driven to rotate, and the pull rod is pulled to drive the blade to swing for performing cutting.

7 Claims, 9 Drawing Sheets

TREE PRUNER

FIELD OF THE INVENTION

The present invention relates to a tree pruner, and more particularly to a tree pruner which can reduce the volume effectively and improve the cutting smoothness greatly.

BACKGROUND OF THE INVENTION

Figure 8:
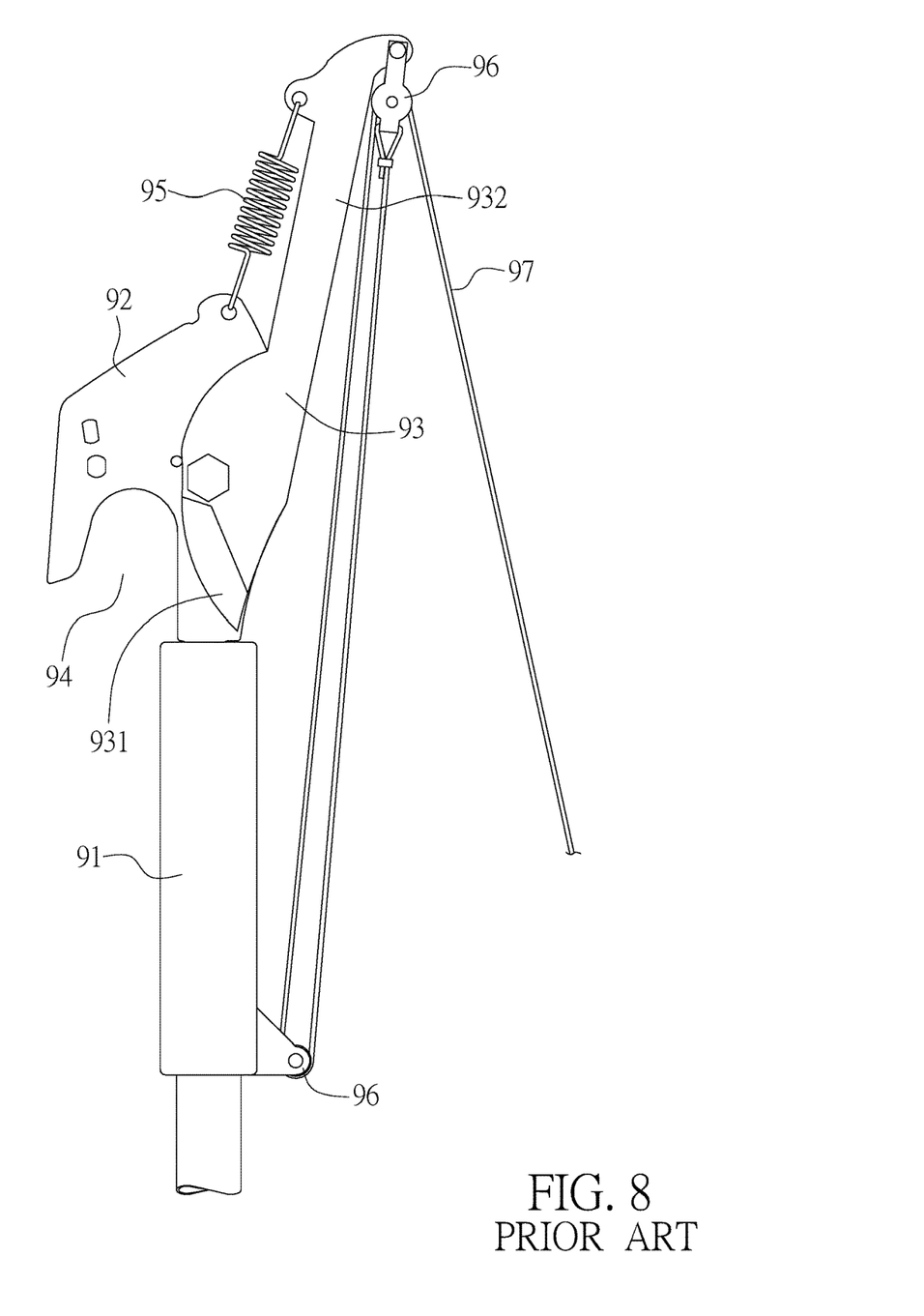
FIG. 8 is a structural schematic view of a conventional tree pruner.

As shown in FIG. 8, a conventional tree pruner adopts a lever-type operation. The conventional tree pruner comprises a blade seat 92 coupled to a connecting pole 91. The blade seat 92 is pivotally connected with a blade 93. The blade seat 92 has a notch 94 facing downward. The blade 93 has a cutting edge 931 corresponding to the notch 94. The blade 93 has an arm portion 932 extending in the direction away from the cutting edge 931. A tension spring 95 is connected between the arm portion 932 and the blade seat 92. By the elastic force of the tension spring 95, the blade 93 is kept at the position not entering the notch 94 in a normal state. The distal end of the arm portion 932 and the connecting pole 91 are provided with pulleys 96, respectively. A rope 97 is wound around the two pulleys 96. By pulling the rope 97, the arm portion 932 of the blade 93 is driven to drive the cutting edge 931 to swing relative to the notch 94 to achieve a cutting operation. However, this tree pruner has the following defects:

1. In order to ensure the labor-saving characteristic, the arm portion 932 (namely, the force arm) of the blade 93 of the conventional tree pruner has a certain length, leading to a problem that the packaging volume is too large.

Figure 9:
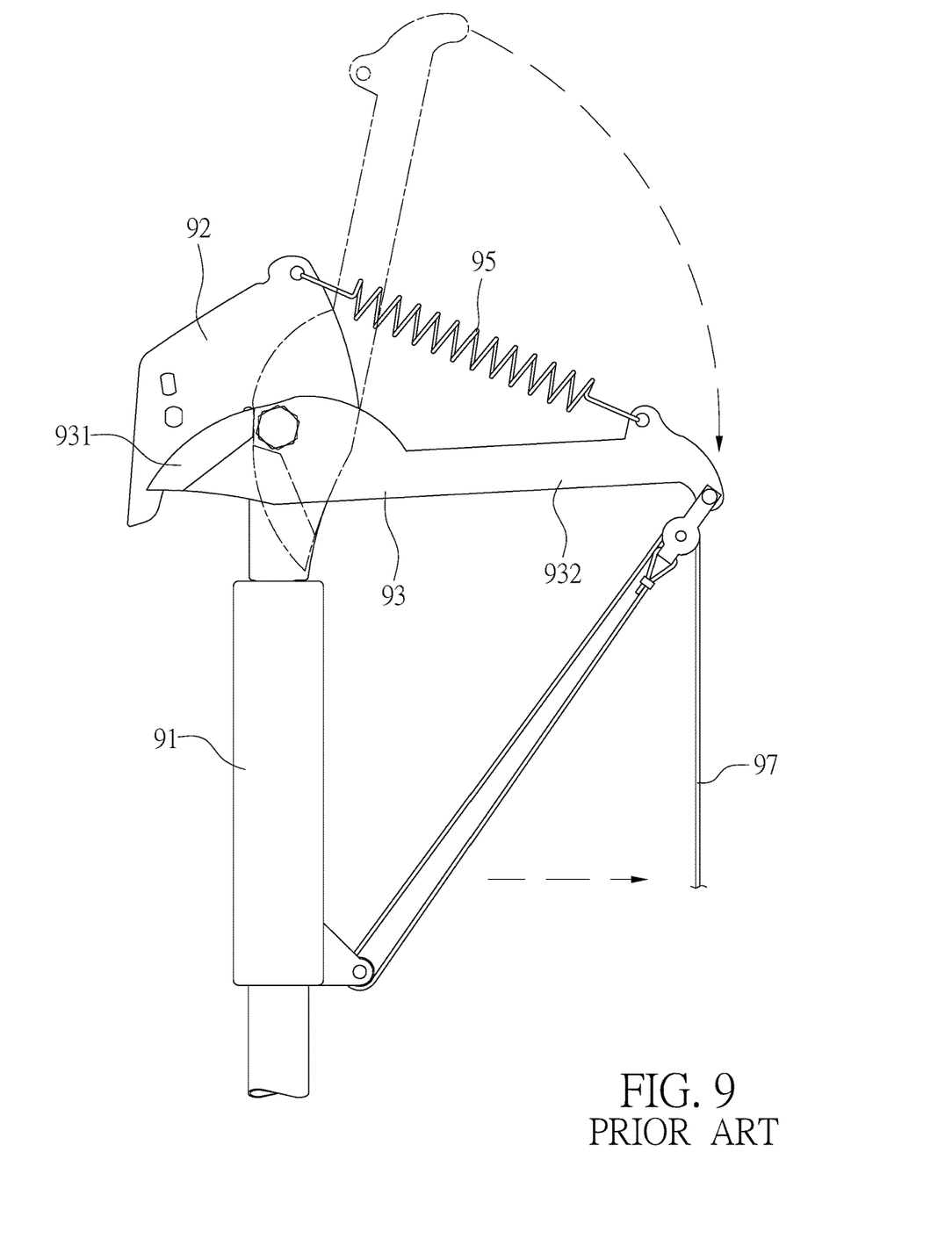
FIG. 9 is a schematic view showing the cutting operation of the conventional tree pruner.

2. In the actual cutting operation, since the arm portion 932 of the blade 93 of the conventional tree pruner is long, as shown in FIG. 9, when the arm portion 932 is driven by the rope 97 to swing outward, the swing radius is likely to be disturbed by the surrounding branches to reduce the cutting efficiency.

3. When the user pulls the rope 97 to drive the arm portion 932 of the conventional tree pruner to swing, the user's arm used to pull the rope 97 must gradually extend outwardly along with the swing path of the arm portion 932. Therefore, the operation is not smooth, and the direction of the applied force of the conventional tree pruner may deviate to disperse the applied force.

Accordingly, the inventor of the present invention has devoted himself based on his many years of practical experiences to solve these problems.

SUMMARY OF THE INVENTION

The primary object of the present invention is to provide a tree pruner which has a labor-saving effect and can reduce the packaging volume greatly.

Another object of the present invention is to provide a tree pruner which can solve the problem that the swing radius of the arm portion of the conventional tree pruner is too large to be disturbed by the surrounding branches. The present invention can effectively ensure the cutting efficiency.

A further object of the present invention is to provide a tree pruner which can ensure that the direction of the force applied by the user is consistent so that the operation is smooth.

In order to achieve the aforesaid object, the tree pruner of the present invention comprises a connecting pole. The connecting pole is connected with a main body. A blade seat is fixedly connected to the main body. A blade is pivotally connected to the blade seat. The blade is pivotal relative to the blade seat for performing cutting.

The main body is pivotally connected with a rotating wheel. The rotating wheel is connected with a pull member. The rotating wheel is rotatable relative to the main body by pulling the pull member. An outer end surface of the rotating wheel is formed with a traction portion located away from a pivot axis of the rotating wheel. The blade has a cutting edge extending toward the blade seat and a drive arm extending outwardly. A distal end of the drive arm is formed with a drive portion. One end of a pull rod is pivotally connected to the traction portion. Another end of the pull rod is pivotally connected to the drive portion. The blade, the pull rod and the rotating wheel are linked with each other. By pulling the pull member, the rotating wheel is driven to rotate, and the pull rod is pulled to drive the cutting edge of the blade to swing for performing cutting.

Preferably, one end of the main body is formed with a receiving end for connecting the connecting pole. Another end of the main body is outwardly enlarged to form a head having a hollow shell shape. One side of the head is communicated with the outside to form an opening. The head has an accommodating space therein. The rotating wheel is correspondingly disposed in the accommodating space. The outer end surface of the rotating wheel is flush with an end edge of the opening.

Preferably, the pull member is in the form of a strap. One end of the pull member is fixedly connected to the rotating wheel. Another end of the pull member is wound around the rotating wheel and then extends downward along a vertical tangent line tangent to an outer circumference of the rotating wheel.

DETAILED DESCRIPTION OF THE PREFERRED EMBODIMENTS

Embodiments of the present invention will now be described, by way of example only, with reference to the accompanying drawings.

As shown in FIGS. 1 to 5, a tree pruner 10 in accordance with the present invention comprises a main body 21 fixedly connected to a connecting pole 11. The main body 21 is provided with a rotating wheel 31, a pull member 41, a blade seat 51, a blade 61, and a pull rod 71.

One end of the main body 21 is formed with a receiving end 22 for connecting the connecting pole 11. Another end of the main body 21 is outwardly enlarged to form a head 23 having a hollow shell shape. One side of the head 23 forms a cavity 24. The head 23 has an accommodating space 25 therein. A shaft seat 26 is convexly provided in the accommodating space 25. An annular wall 27 is provided around the shaft seat 26. The annular wall 27 is spaced apart from the shaft seat 26 and has a notch 271.

The rotating wheel 31 is correspondingly disposed in the accommodating space 25. The rotating wheel 31 is in the shape of a disk. The rotating wheel 31 has an inner end surface 311 facing the shaft seat 26, an outer end surface 312 opposite to the inner end surface 311, and a circumferential surface 313 located between the inner end surface 311 and the outer end surface 312. In this embodiment, when the rotating wheel 31 is assembled in the accommodating space 25, the outer end surface 312 of the rotating wheel 31 is flush with the end edge of the cavity 24. The pull member 41 is in the form of a strap. One end of the pull member 41 is fixedly connected to an engaging groove 32 of the circumferential surface 313. The other end of the pull member 41 is wound along the circumferential surface 313 and then extends downward along a vertical tangent line D tangent to the outer circumference of the rotating wheel 31 and is connected to a pulley block 42. The blade seat 51 has a downward notch 52. One side of the notch 52 is formed with a first connecting portion 53 located above the notch 52 and a second connecting portion 54 located under the notch 52. The blade seat 51 has a first pivot portion 55 between the first connecting portion 53 and the second connecting portion 54. The second connecting portion 54 of the blade seat 51 is fixed to the receiving end 22 of the main body 21. The first connecting portion 53 is opposite to a pivot axis O of the rotating wheel 31. A pivot shaft 33 passes through the first connecting portion 53 and the pivot axis O of the rotating wheel 31 in sequence and is connected to the shaft seat 26, so that the blade seat 51 is positioned on the main body 21 and the rotating wheel 31. By pulling the pull member 41, the rotating wheel 31 can be rotated relative to the main body 21 about the pivot shaft 33.

A torsion spring 28 is provided between the shaft seat 26 and the annular wall 27. One end of the torsion spring 28 is against the notch 271 of the annular wall 27. The other end of the torsion spring 28 is against an engaging portion 34 in the form of a protruding post on the inner surface 311 of the rotating wheel 31. When the pull member 41 drives the rotating wheel 31 to rotate, the engaging portion 34 gradually compresses the torsion spring 28 along with the rotation of the rotating wheel 31, thereby providing the rotating wheel 31 with kinetic energy of a reverse rotation.

Figure 1:
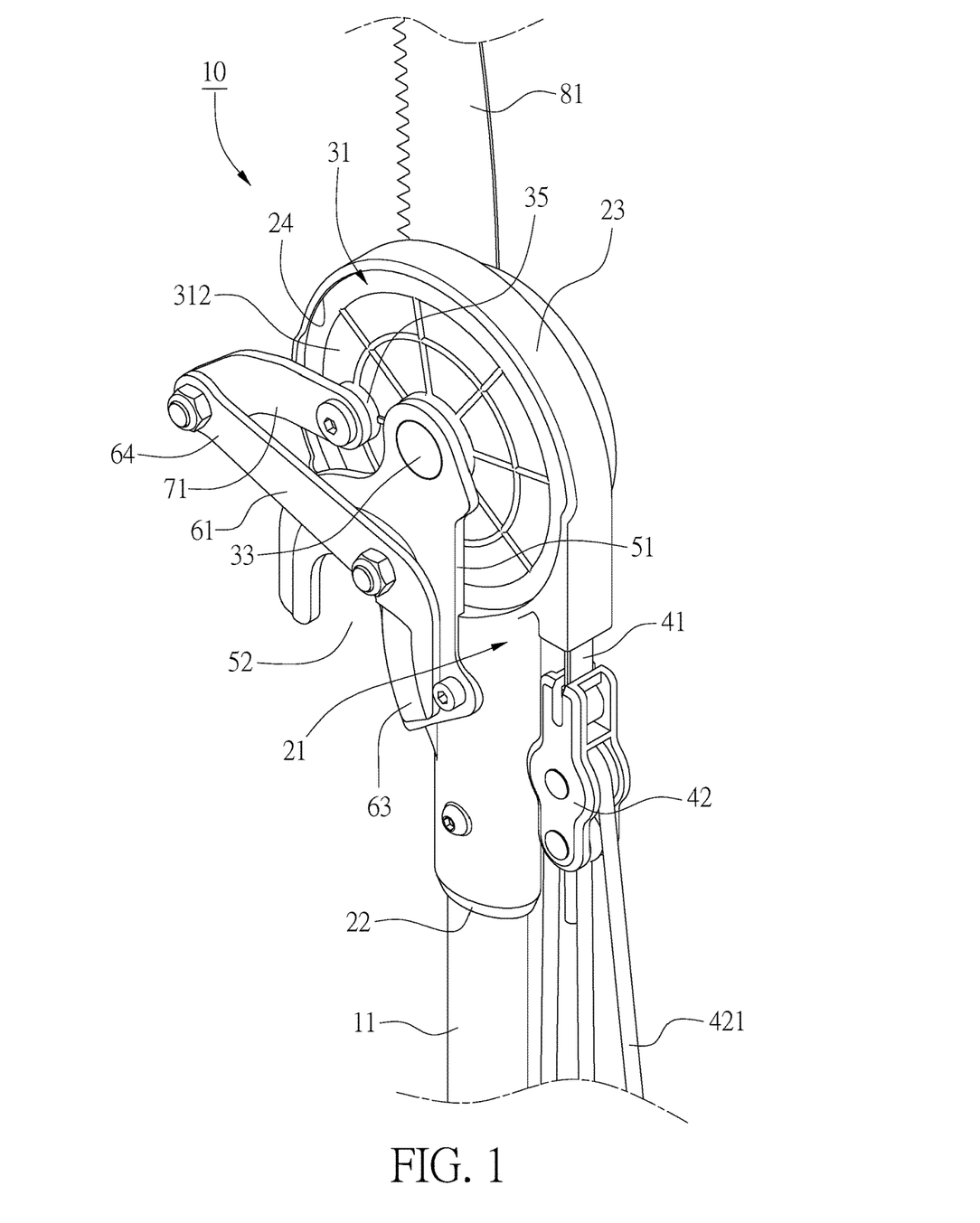
FIG. 1 is a perspective view of the present invention.
Figure 2:
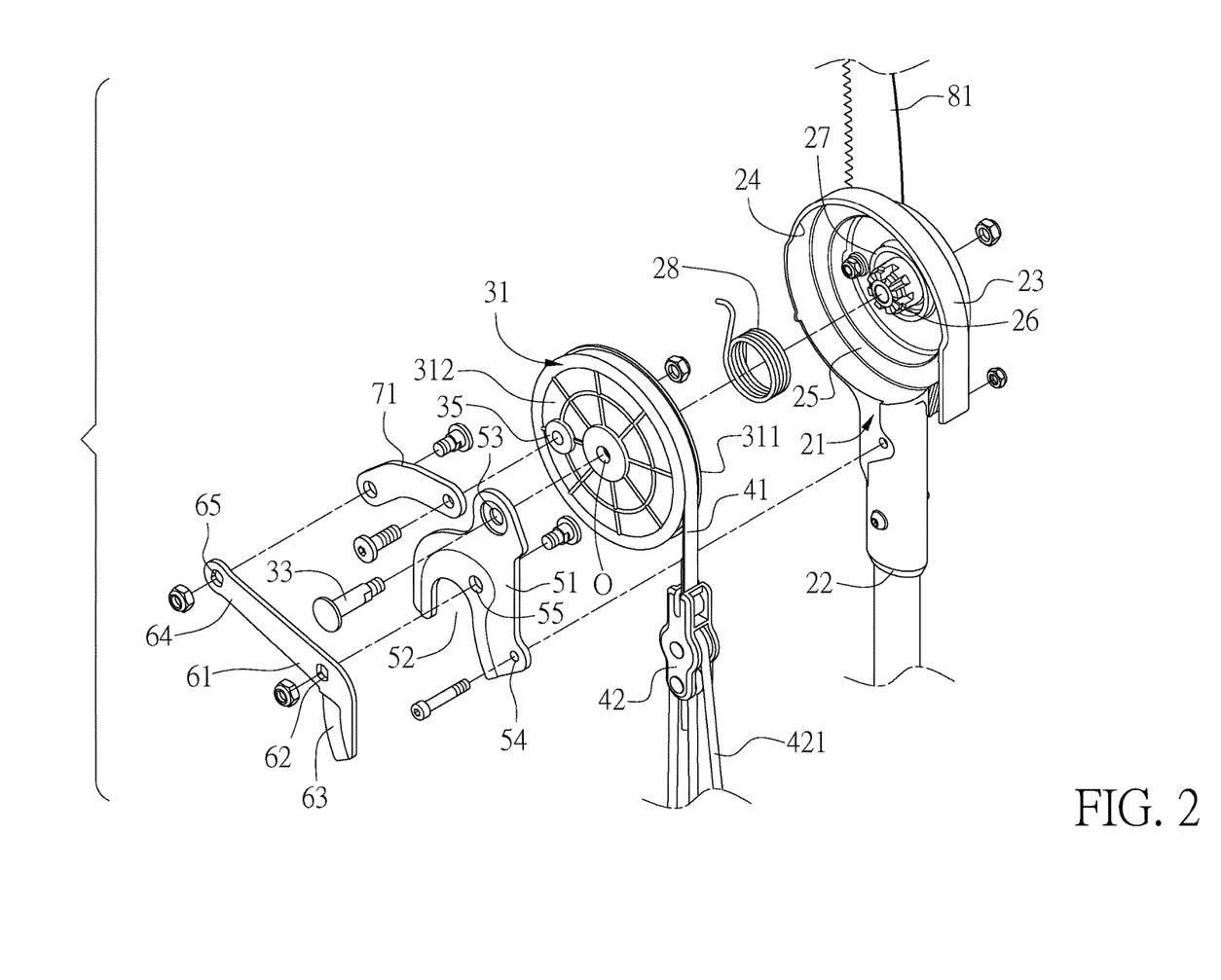
FIG. 2 is an exploded view of the present invention.
Figure 3:
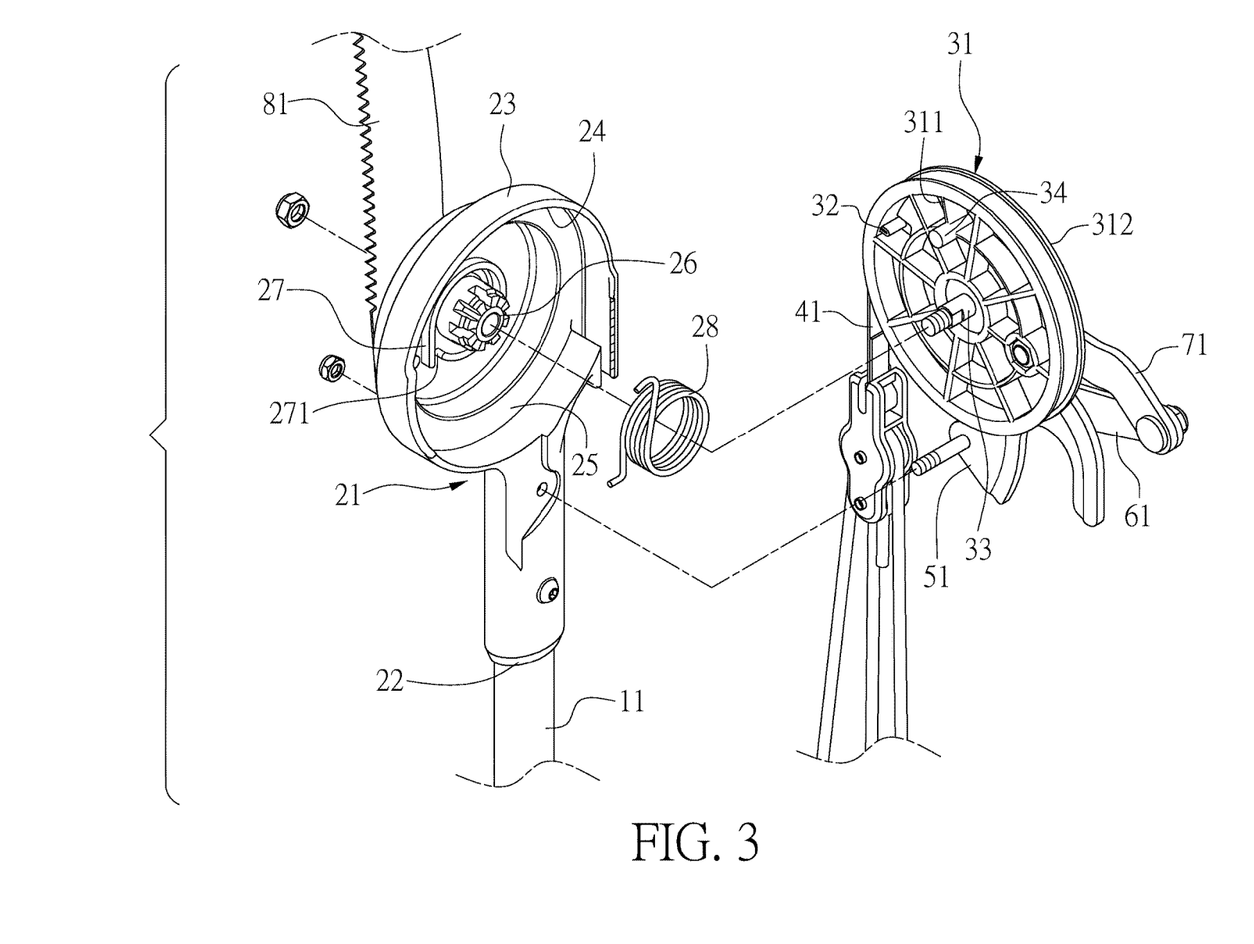
FIG. 3 is a schematic view of the present invention.
Figure 4:
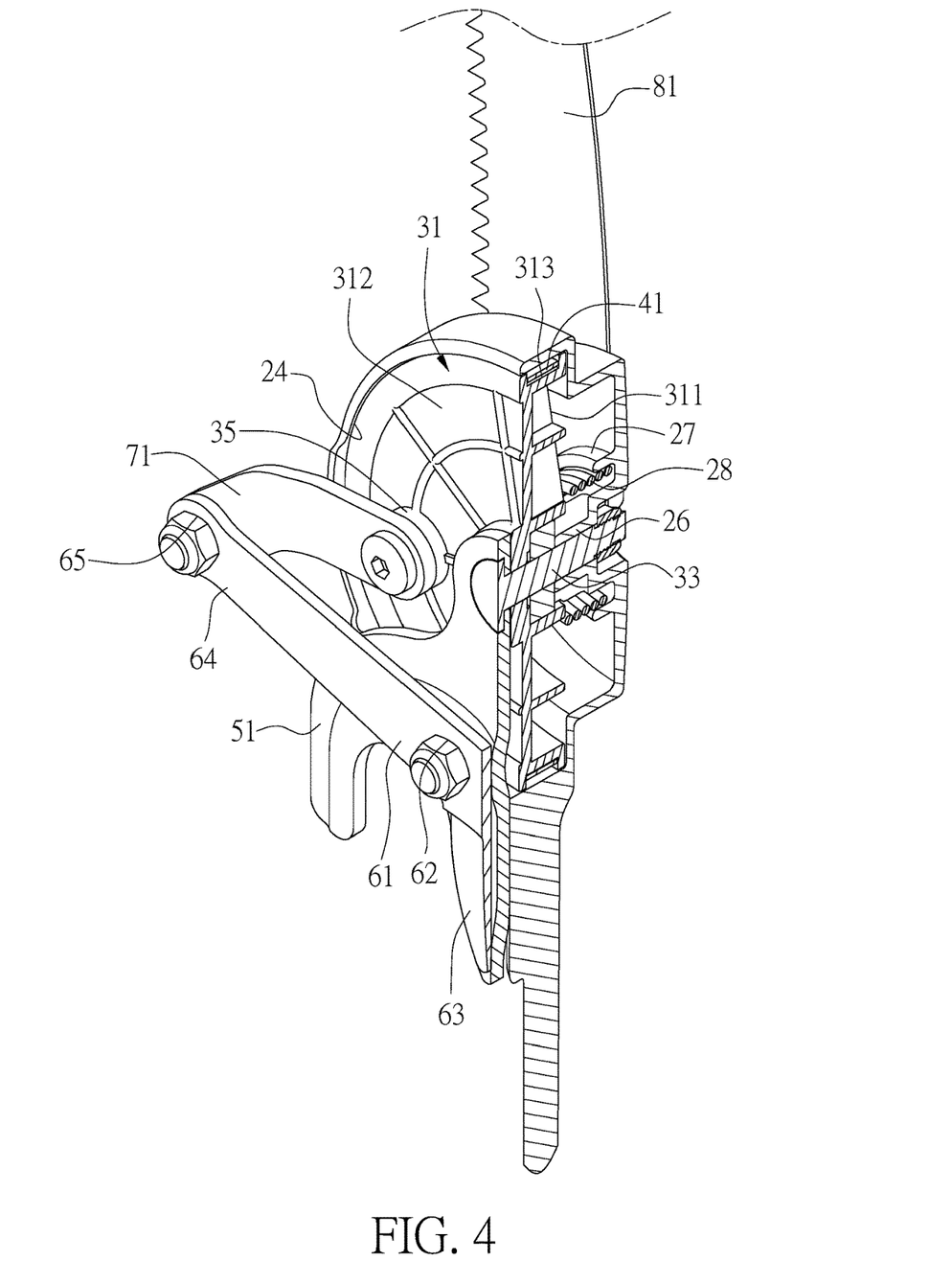
FIG. 4 is a sectional schematic view of the present invention after assembled.
Figure 5:
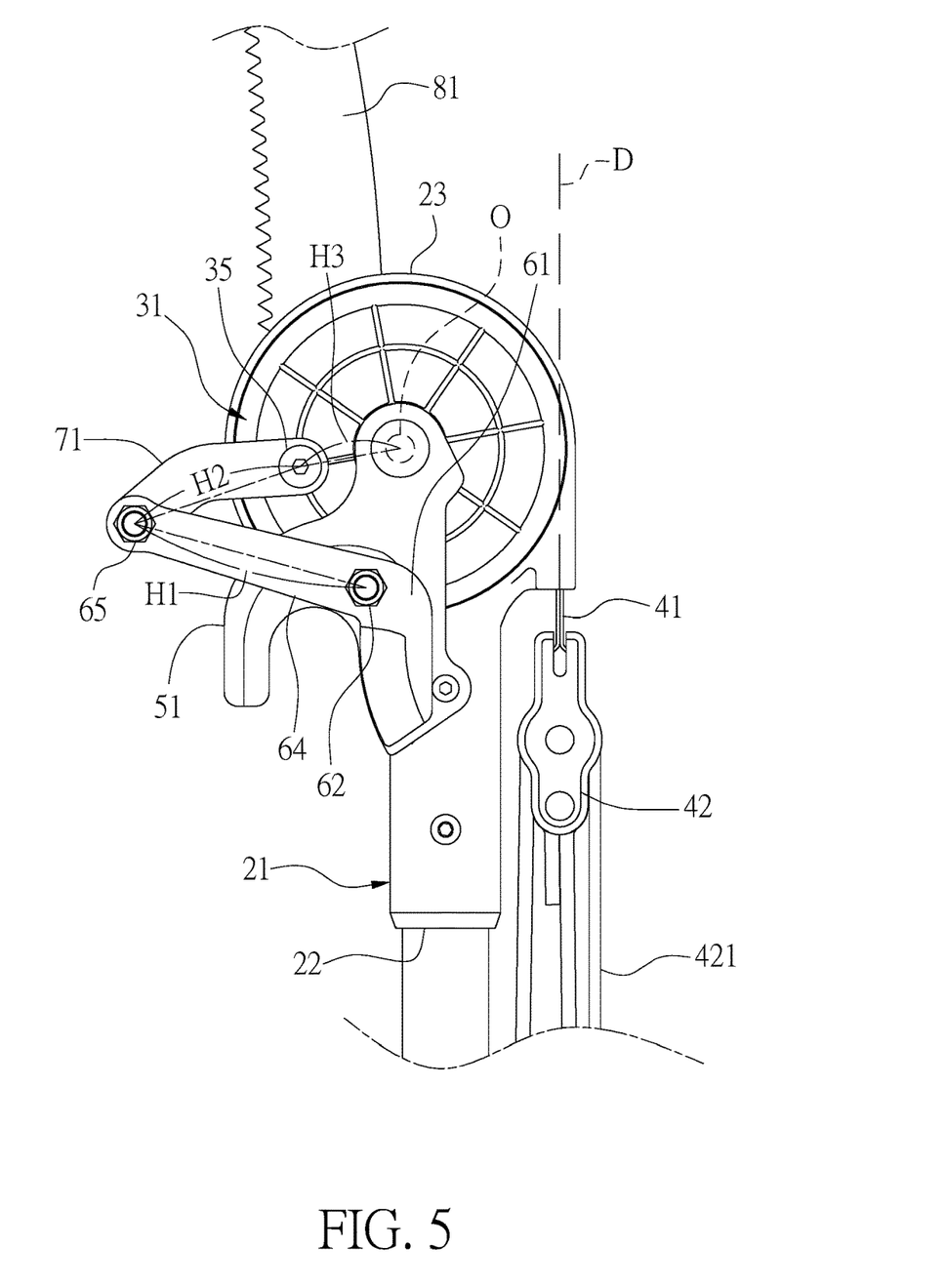
FIG. 5 is a structural schematic view of the present invention after assembled.

The middle portion of the blade 61 has a second pivot portion 62. The second pivot portion 62 of the blade 61 is pivotally connected to the first pivot portion 55 of the blade seat 51. Two ends of the blade 61 are respectively formed with a cutting edge 63 extending toward the notch 52 and a drive arm 64 substantially perpendicular to the cutting edge 63 and extending outwardly. The distal end of the drive arm 64 is formed with a drive portion 65. The outer end surface 312 of the rotating wheel 31 is formed with a traction portion 35 located away from the pivot axis O. The pull rod 71 has two opposite ends. The two ends of the pull rod 71 are bent to have an angle of about 140-145 degrees. One end of the pull rod 71 is pivotally connected to the traction portion 35 and the other end is pivotally connected to the drive portion 65 of the blade 61, so that the blade 61, the pull rod 71 and the rotating wheel 31 form a connection relation with each other. Through the elastic function of the torsion spring 28, in the normal state, the blade 61 is kept at a position where it does not enter the notch 52. As shown in FIG. 5, in this embodiment, the linear distance H1 of the drive arm 64 from the second pivot portion 62 to the drive portion 65 is greater than the linear distance H2 of the pull rod 71 from the drive portion 65 to the traction portion 35. The linear distance H2 of the pull rod 71 from the drive portion 65 to the traction portion 35 is greater than the linear distance H3 of the rotating wheel 31 from the pivot axis O to the traction portion 35.

Figure 6:
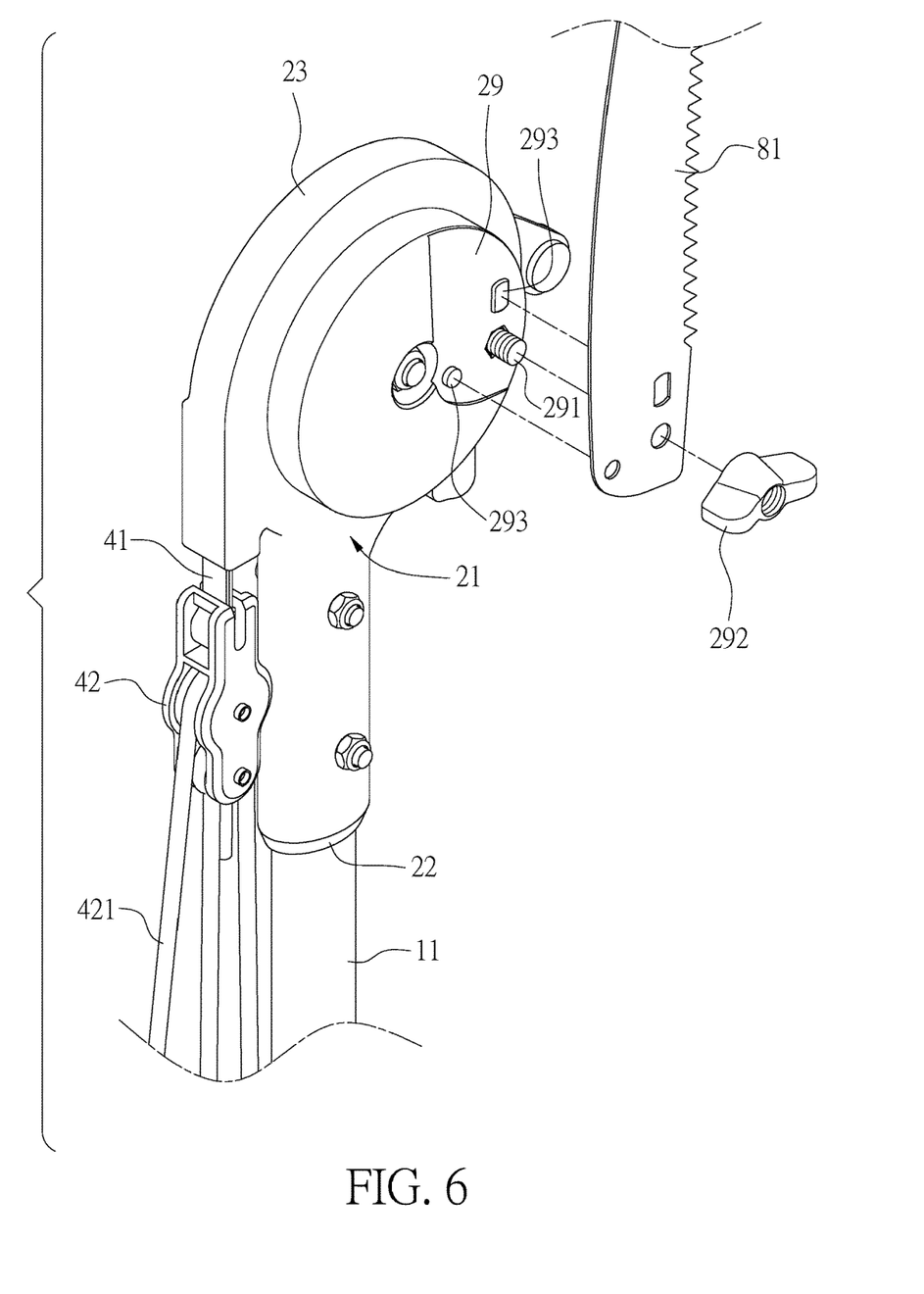
FIG. 6 is a schematic view of the knife of the present invention.

Furthermore, as shown in FIG. 6, one side of the head 23, opposite to the opening 24, is formed with an engaging recess 29 for mounting a knife 81. The engaging recess 29 is provided with a screw portion 291 for engagement of a locking member 292 and two protrusions 293. The screw portion 291 and the two protrusions 293 pass through the knife 81, and then the locking member 292 is locked on the screw portion 291 so that the knife 81 is positioned on the head 23.

Figure 7:
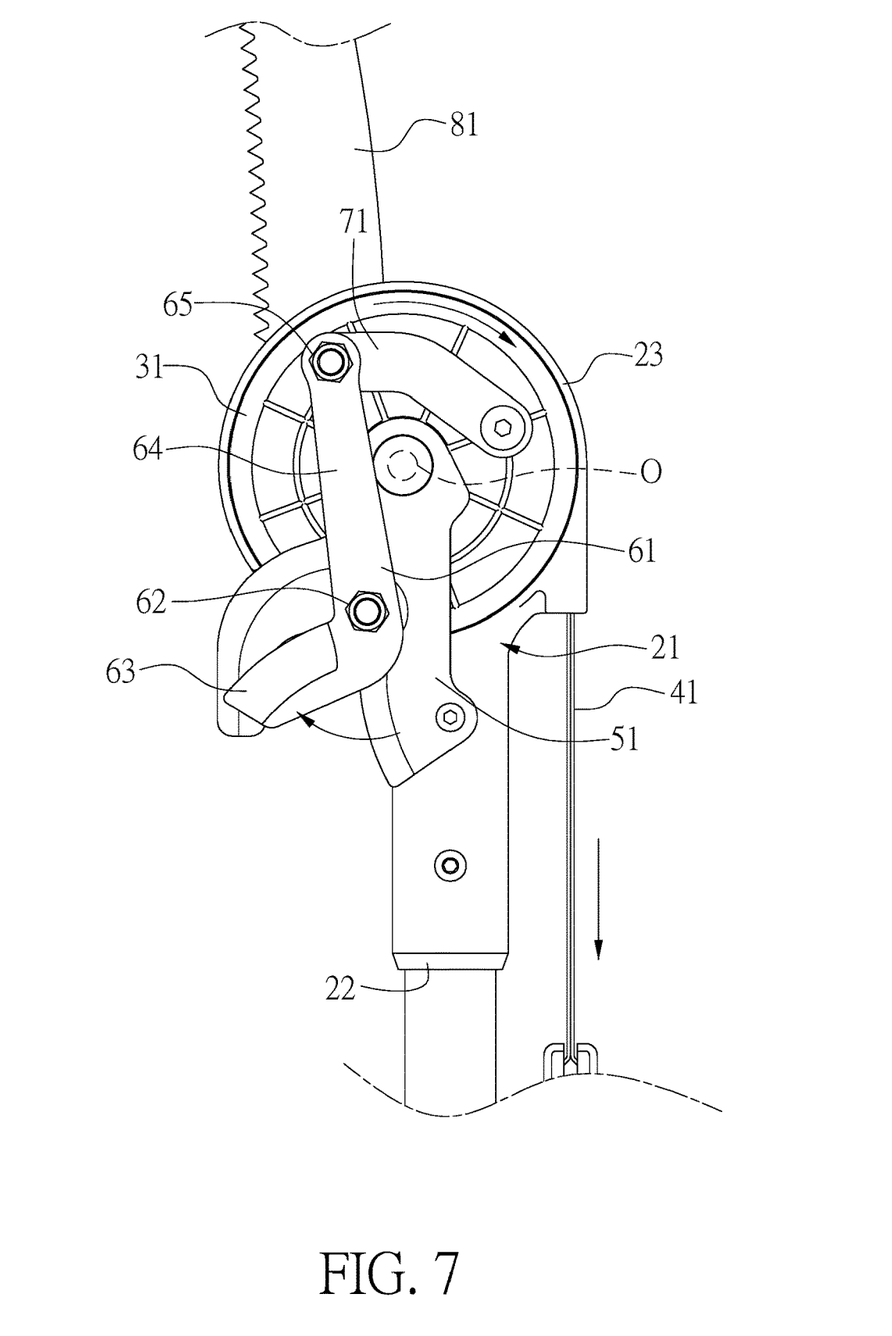
FIG. 7 is a schematic view showing the cutting operation of the present invention.

In use, as shown in FIG. 7, when the user manually pulls a pull rope 421 of the pulley block 42 downward along the vertical tangent line D to synchronously drive the pull member 41 downward. The rotating wheel 31 is driven to rotate about the pivot shaft 33, and the pull rod 71 is pivoted with the rotating wheel 31 so that the pull rod 71 drives the drive arm 64 of the blade 61 to swing with the second pivot portion 62 as an axis and the cutting edge 63 of the blade 61 can be swung toward the notch 52 for cutting. When the pull member 41 is moved downward to drive the rotating wheel 31 to rotate, the torsion spring 28 located in the accommodating space 25 is gradually compressed by the engaging portion 34. When the user completes the cutting and releases the pull member 41, the rotating wheel 31 can be driven to rotate in the reverse direction by the return elastic force of the torsion spring 28 itself, so that the pull member 41, the pull rod 71 and the blade 61 can be pivoted with the reverse rotation of the rotating wheel 31 to return to the initial state (as shown in FIG. 5).

According to the above structure, the present invention has the following advantages:

1. The present invention has a labor-saving effect by virtue of its structure. With the arrangement of the rotating wheel 31, the packaging volume can be reduced greatly.

2. In the actual cutting operation of the present invention, the pull member 41 drives the rotating wheel 31 to rotate about the pivot shaft 33 and further drives the pull rod 71 and the blade 61 to perform cutting. Therefore, there is no problem that the swing radius of the arm portion of the conventional tree pruner is too large to be disturbed by the surrounding branches. The present invention can effectively ensure the cutting efficiency.

3. In the present invention, the pull member 41 has one end connected to the rotating wheel 31 and the other end extending downward along the vertical tangent line D tangent to the outer circumference of the rotating wheel 31. Therefore, when in use, the pull member 41 is pulled by applying a vertical downward single force to synchronously drive the rotating wheel 31 to rotate, and then the pull rod 71 and the blade 61 can be driven to perform cutting. The present invention not only can be smoother in operation but also can effectively solve the problem that the direction of the applied force of the conventional tree pruner may deviate to disperse the applied force.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A tree pruner, comprising a connecting pole, the connecting pole being connected with a main body, a blade seat being fixedly connected to the main body, a blade being pivotally connected to the blade seat, the blade being pivotal relative to the blade seat for performing cutting, characterized in that:

the main body is provided with a rotating wheel, the rotating wheel is connected with a pull member, the rotating wheel is rotatable relative to the main body by pulling the pull member, an outer end surface of the rotating wheel is formed with a traction portion located away from a pivot axis of the rotating wheel, the blade has a cutting edge extending toward the blade seat and a drive arm extending outwardly, a distal end of the drive arm is formed with a drive portion, one end of a pull rod is pivotally connected to the traction portion, the other end of the pull rod is pivotally connected to the drive portion, the blade, the pull rod and the rotating wheel are linked with each other, by pulling the pull member, the rotating wheel is driven to rotate, and the pull rod is pulled to drive the cutting edge of the blade to swing for performing cutting.

2. The tree pruner as claimed in claim 1, wherein one end of the main body is formed with a receiving end for connecting the connecting pole, another end of the main body is outwardly enlarged to form a head having a hollow shell shape defining a cavity and having an accommodating space therein, the rotating wheel is correspondingly disposed in the accommodating space, and the outer end surface of the rotating wheel is flush with an end edge of the cavity.

3. The tree pruner as claimed in claim 2, wherein one side of the head, opposite to the opening, is formed with an engaging recess for mounting a knife, the engaging recess is provided with a screw portion for engagement of a locking member and at least one protrusion.

4. The tree pruner as claimed in claim 2, wherein a shaft seat is convexly provided in the accommodating space, the blade seat has a downward notch, one side of the notch is formed with a first connecting portion located above the notch and a second connecting portion located under the notch, the blade seat has a first pivot portion between the first connecting portion and the second connecting portion, the second connecting portion of the blade seat is fixed to the receiving end of the main body, the first connecting portion is opposite to the pivot axis of the rotating wheel, a pivot shaft passes through the first connecting portion and the pivot axis of the rotating wheel in sequence and is connected to the shaft seat, so that the blade seat is positioned on the main body and the rotating wheel, by pulling the pull member, the rotating wheel can be rotated relative to the main body about the pivot shaft.

5. The tree pruner as claimed in claim 4, wherein an annular wall is provided around the shaft seat, the annular wall is spaced apart from the shaft seat and has a notch, the rotating wheel has an inner end surface facing the shaft seat, the outer end surface is opposite to the inner end surface, a circumferential surface is formed between the inner end surface and the outer end surface, a torsion spring is provided between the shaft seat and the annular wall, one end of the torsion spring is against the notch of the annular wall, and the other end of the torsion spring is against an engaging portion on the inner end surface.

6. The tree pruner as claimed in claim 4, wherein a middle portion of the blade has a second pivot portion, the second pivot portion of the blade is pivotally connected to the first pivot portion of the blade seat, a linear distance of the drive arm from the second pivot portion to the drive portion is greater than a linear distance of the pull rod from the drive portion to the traction portion, and the linear distance of the pull rod from the drive portion to the traction portion is greater than a linear distance of the rotating wheel from the pivot axis to the traction portion.

7. The tree pruner as claimed in claim 1, wherein the pull member is in the form of a strap, one end of the pull member is fixedly connected to the rotating wheel, and the other end of the pull member is wound around the rotating wheel and then extends downward along a vertical tangent line tangent to an outer circumference of the rotating wheel.

* * * * *